Nov. 29, 1960  S. A. BENKTANDER  2,962,328

DOUBLE-ROW CYLINDRICAL ROLLER BEARINGS

Filed April 3, 1959

*Inventor:*
*Sven Anders Benktander*
*by Howson & Howson*
*Attys.*

United States Patent Office 2,962,328
Patented Nov. 29, 1960

2,962,328

DOUBLE-ROW CYLINDRICAL ROLLER BEARINGS

Sven Anders Benktander, Goteborg, Sweden, assignor to Aktiebolaget Svenska Kullagerfabriken, Goteborg, Sweden, a corporation of Sweden Filed Apr. 3, 1959, Ser. No. 803,983

Claims priority, application Sweden Apr. 23, 1958

5 Claims. (Cl. 308—180)

The present invention relates to double-row cylindrical roller bearings, and has particular application to bearings for the axles of railway vehicles.

A primary object of the present invention is to provide a bearing which is adapted to provide varying amounts of axial play or movement in the bearing.

Another object of the present invention is to provide a double-row cylindrical roller bearing designed in such a manner that it can be changed from a shaft-locating bearing to a bearing permitting limited axial movement of the shaft merely through a simple rearrangement of the parts of the bearing.

The double-row cylindrical roller bearing according to the invention comprises one race ring common to both rows of rollers and having a guide flange between the rows, a separate race ring opposed to said common race ring for each row of rollers, each of said separate rings having flanges at each end of the rollers forming guide faces for guiding the rollers. The invention is characterized by forming at least one of the separate race rings so that the distances from the ends of the ring to the adjacent guide faces are different, and so that the separate race ring is transposable with respect to the common ring. The width of the flange of said common ring is no greater than the smallest distance between the two rows of rollers permitted by said guide faces.

If the separate rings are applied with the wider flanges disposed adjacent each other, the bearing will allow greater axial movement of the shaft than if they are disposed with their narrower flanges adjacent each other. If a broad and a narrow flange are positioned adjacent each other, the bearing will provide for an intermediate amount of axial play. In order to attain this result it is not necessary to provide additional members, remove members or change members. All that is required is to apply the separate rings in different relative positions. This makes it possible to dispense with loose spacer rings between the race rings, which cause extra trouble in assembling the bearing, since they have a tendency to assume a position eccentric with respect to the other bearing members. The elimination of spacer rings also reduces the number of surfaces to be ground.

The bearing according to the invention is especially useful when mounted in axle boxes for railway vehicles in which more than two axles are mounted in the same frame or bogie, and in which, therefore, a certain amount of lateral motion is required in all axles except two in order to avoid distortion and wheel flange wear when going around curves. The invention can also be used where a pair of axles are mounted in the same bogie and it is desired to improve the running of the bogie or vehicle by varying the amount of lateral motion which the bearings permit. All axles in a rail vehicle can thus be provided with the same kind of bearing whereby the number of spare parts required will be reduced, and part storage will be simplified.

The objects and operation of bearings made in accordance with the present invention are more fully set forth hereinafter with reference to the accompanying drawings, in which.

Figure 1:
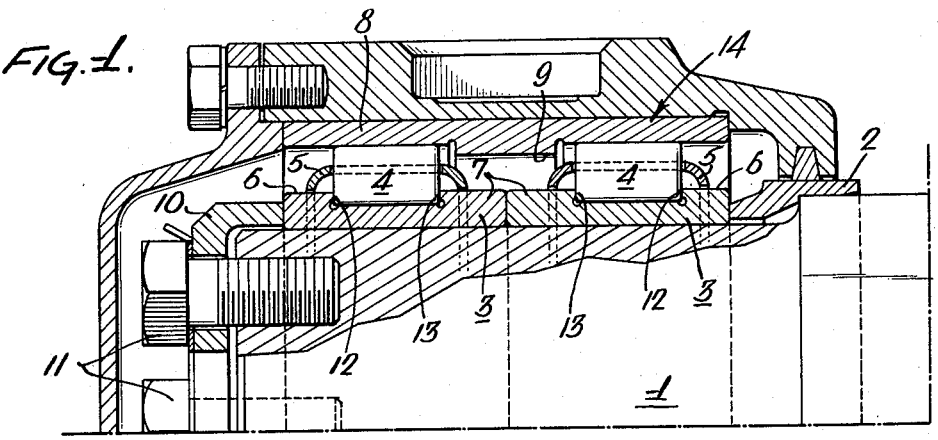
Fig. 1 is an axial section through an axle box having a bearing made in accordance with the invention disposed to permit a certain amount of axial motion in the box.
Figure 5:
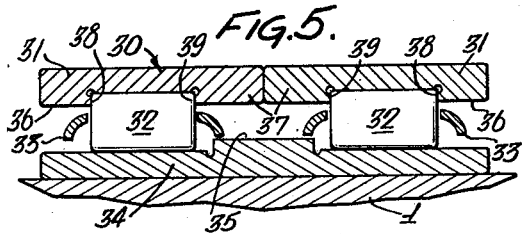
Figure 6:
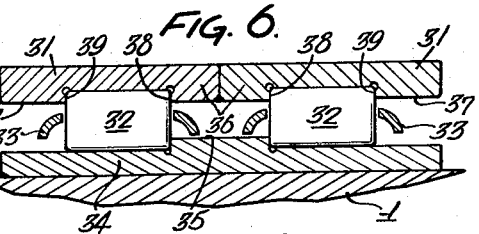
Figure 3:
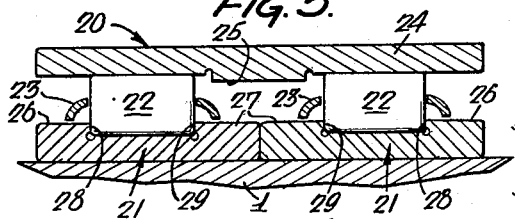
Figs. 3 and 4 are sections through a modified bearing affording different degrees of axial movement, Fig. 3 showing the arrangement affording maximum motion, and Fig. 4 showing the arrangement affording minimum movement.
Figure 7:
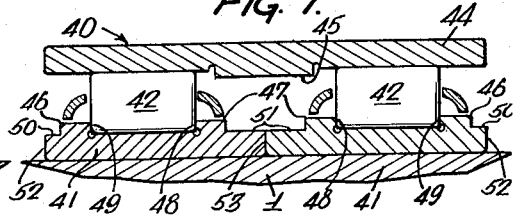
Figure 4:
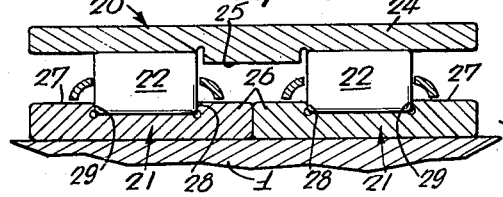
Figure 8:
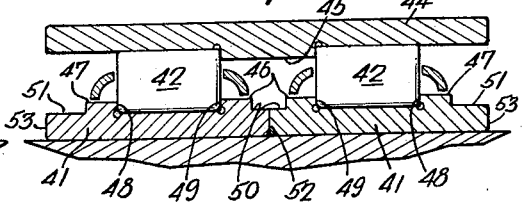
Figure 2:
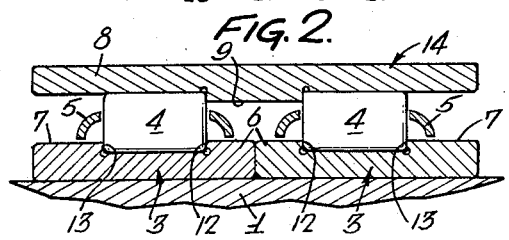
Fig. 2 is a section through the bearing of Fig. 1 disposed to positively locate the axle by preventing axial movement.

Figs. 5 and 6 are views similar to Figs. 3 and 4, respectively of another embodiment of the invention, in one position affording limited axial movement, and in another position positively locating the axle, and Figs. 7 and 8 are views similar to Figs. 3 and 4 respectively of a further embodiment in which the flanges of the separate race rings are of equal width and which functions similarly to the bearing of Figs. 1 and 2.

In the Figs. 1 and 2 the numeral 1 designates the axle of a pair of wheels of a rail vehicle having a bearing 14. On the axle 1 is first mounted a collar 2, after which two separate inner race rings 3 with rollers 4 and cages 5 of the bearing 14 are applied. Each inner race ring 3 has two flanges 6 and 7 of different widths forming guide faces 12 and 13 respectively for the rollers. The outer race ring 8 of the bearing 14 is common to both rows of rollers and is provided with a flange 9 the width of which is no greater than the total width of the two narrower flanges 6 of the inner race rings 3. An end disc 10 is fixed to the end of the axle 1 by three screws 11 and bears against the inner ring 3 which is outermost on the axle.

In the operation of the device, when maximum axial play is desired the rings are applied so that the wider flanges 7 are turned toward each other as shown in Fig. 1. The distance between the rows of rollers, as determined by the spacing of the adjacent guide faces 13, is greater than the width of the flange 8 of the outer ring and the rollers (and the axle) may be axially displaced relative to the outer ring a distance corresponding to the difference between the width of the flange 9 and the spacing of the faces 13, or, in the present instance, twice the difference between the widths of the flanges 6 and 7, respectively.

In Fig. 2, the narrower flanges 6 of the inner race rings are turned toward each other. The distance between the rows of rollers, as determined by the spacing of the adjacent guide faces 12, will in this case be equal to the width of the flange 9 of the outer race ring. In this case the bearing will locate the axle against any axial motion.

If it is desired to afford axial displacement equal to once the difference between the widths of the flanges 6 and 7, only one of the rings 3 is reversed so that the flanges 6 and 7 are abutting. In this case the bearing affords axial displacement corresponding to the difference between the width of the flange 9 and the spacing of the adjacent guide faces 12 and 13, or once the difference between the widths of the flanges 6 and 7.

It is not necessary that the bearing be made in this manner. If desired, a certain amount of lateral motion may be allowable in all relative positions of the inner rings, the essential thing being that the amount of lateral motion allowed by the bearing may be varied. Figs. 3 and 4 illustrate a bearing 20 of this character. The bearing 20 comprises separate inner race rings 21, rollers 22, cages 23 and a common outer race ring 24. The common race ring 24 has a central flange 25, and each separate race ring 21 has flanges 26 and 27 of different widths defining guide faces 28 and 29 for the rollers 22. In the present instance the spacing of the faces 29, when the flanges 27 are mounted adjacent each other, as shown in Fig. 3, is substantially greater than the width of the flange 25 to afford maximum axial displacement in the bearing. When the flanges 26 are mounted adjacent each other, as shown in Fig. 4, the spacing between the guide faces 28 is only slightly greater than the width of the flange 25 to afford minimum axial displacement. If the flange 26 of one ring 21 is mounted adjacent the flange 27 of the other ring 21, the spacing between the adjacent guide faces 28 and 29 affords intermediate axial displacement. Greater variations in axial displacement may be provided by using dissimilar, separate race rings; for example, a ring like the ring 3 in conjunction with a ring like ring 21, thereby providing four different spacings between the adjacent guide faces; i.e. the spacing afforded by (1) the flanges 6 and 26, (2) the flanges 7 and 26, (3) the flanges 6 and 27, and (4) the flanges 7 and 27. Other combinations may be made to provide the desired range of variation.

The invention is described above as being applied to an axle box, but its use is not limited hereto. If desired, the design may be reversed so that the inner race ring may be made common to both rows of rollers and separate outer race rings provided. This is shown in Figs. 5 and 6, wherein a bearing 30 is provided, having separate outer race rings 31, rollers 32, cages 33 and a common inner race ring 34. The common race ring has a central flange 35, and each separate race ring 31 has flanges 36 and 37 of different widths defining guide faces 38 and 39 for the rollers 32. In the present instance, the spacing of the faces 39, when the flanges 37 are mounted adjacent each other as shown in Fig. 5, is the same as the spacing of the faces 13 of the bearing shown in Fig. 1. When the flanges 36 are mounted adjacent each other, as shown in Fig. 6, the spacing of the adjacent guide faces is equal to the width of the flange 35 to preclude axial displacement. Of course different flange widths may be used, for example as described in connection with Figs. 3 and 4.

The bearings of the invention have been described as having flanges of different widths. It is clear, however, that the flanges of the separate race rings may be of the same width, as long as the race rings are made so that the distances from the ends of each ring to the adjacent guide faces of the ring is greater at one end of the ring than at the other. For example, as shown in Figs. 7 and 8, a bearing 40 may be provided having separate inner race rings 41, rollers 42, cages 43, and a common outer race ring 44, the common race ring has a central flange 45, and each separate race ring 41 has flanges 46 and 47 defining guide faces 48 and 49 for the rollers 42. The flanges 46 and 47 are of equal width, but to provide variation in axial displacement, extensions 50 and 51 are provided between the flanges 46 and 47 and the ends 52 and 53 respectively of the separate rings. In the present instance, the spacing of the faces 49, when the flanges 47 are mounted adjacent each other as shown in Fig. 7, is the same as the spacing of the faces 13 of the bearing shown in Fig. 1. When the flanges 46 are mounted adjacent each other, as shown in Fig. 8, the spacing of the adjacent guide faces is equal to the width of the flange 45 to preclude axial displacement. Of course different flange widths may be used, for example as described in connection with Figs. 3 and 4, or the inner and outer race rings may be reversed, as described in connection with Figs. 5 and 6.

The changeover from a bearing for guiding the axle to a bearing permitting lateral motion may be accomplished by any suitable transposition of at least one of the race rings, for instance by reversing one or both of the race rings, or by interchanging them. While particular embodiments of the present invention have been illustrated and described, it is not intended to limit the invention to such disclosure, but changes and modifications may be made therein and thereto within the scope of the following claims.

I claim:

1. A cylindrical roller bearing having two rows of rollers, one race ring common to both rows of rollers, said race ring having a central guide flange between the said rollers, and a separate race ring opposed to said one race ring for each row of rollers, said separate race rings being mounted in endwise abutting relation intermediate said central flange, each of the said separate rings having flanges at each end of the rollers defining guide faces for guiding the rollers, the spacing between said guide faces and the adjacent ends of at least one of the separate race rings being different, said one separate race ring being transposable with respect to the said common ring to provide different spacing between the adjacent guide faces of the abutting separate race rings, the width of the central flange of the said common ring being no greater than the smallest spacing between adjacent guide faces.

2. A roller bearing according to claim 1, wherein said central flange is equal to the smallest spacing between adjacent guide faces whereby when said separate race rings are mounted with said smallest spacing, said rollers are held against axial displacement relative to said one race ring.

3. A roller bearing according to claim 1, wherein said central flange is less than the smallest spacing between adjacent guide faces whereby said rollers are displaceable axially relative to said one race ring a distance corresponding to the difference between said flange width and said spacing.

4. A roller bearing according to claim 1, wherein the flanges of said separate race rings extend from said guide face to the adjacent end of the ring, the flanges of at least one of said rings being of different width.

5. A roller bearing according to claim 1, wherein the flanges of at least one of said separate race rings are of equal width, and including at least one axial extension between a flange and the adjacent end of the ring providing different spacings between the guide faces and their respective adjacent ends of the ring.

References Cited in the file of this patent

UNITED STATES PATENTS

| 2,562,045 | Knaak | July 24, 1951 |
| 2,878,083 | Altson | Mar. 17, 1959 |

FOREIGN PATENTS

| 331,985 | Germany | Jan. 18, 1921 |
| 678,250 | Great Britain | Aug. 27, 1952 |